Aug. 23, 1966   R. B. STERNS ETAL   3,267,781
METHOD AND APPARATUS FOR PRESETTING MATERIAL CONSUMING
MACHINES TO ADJUST PRODUCT PARAMETERS
Filed Oct. 30, 1963   3 Sheets-Sheet 1

INVENTORS
ROBERT B. STERNS
RICHARD McGUIRE
BY
Ward, Neal, Hazelton, Orme + McElhannon
ATTORNEYS

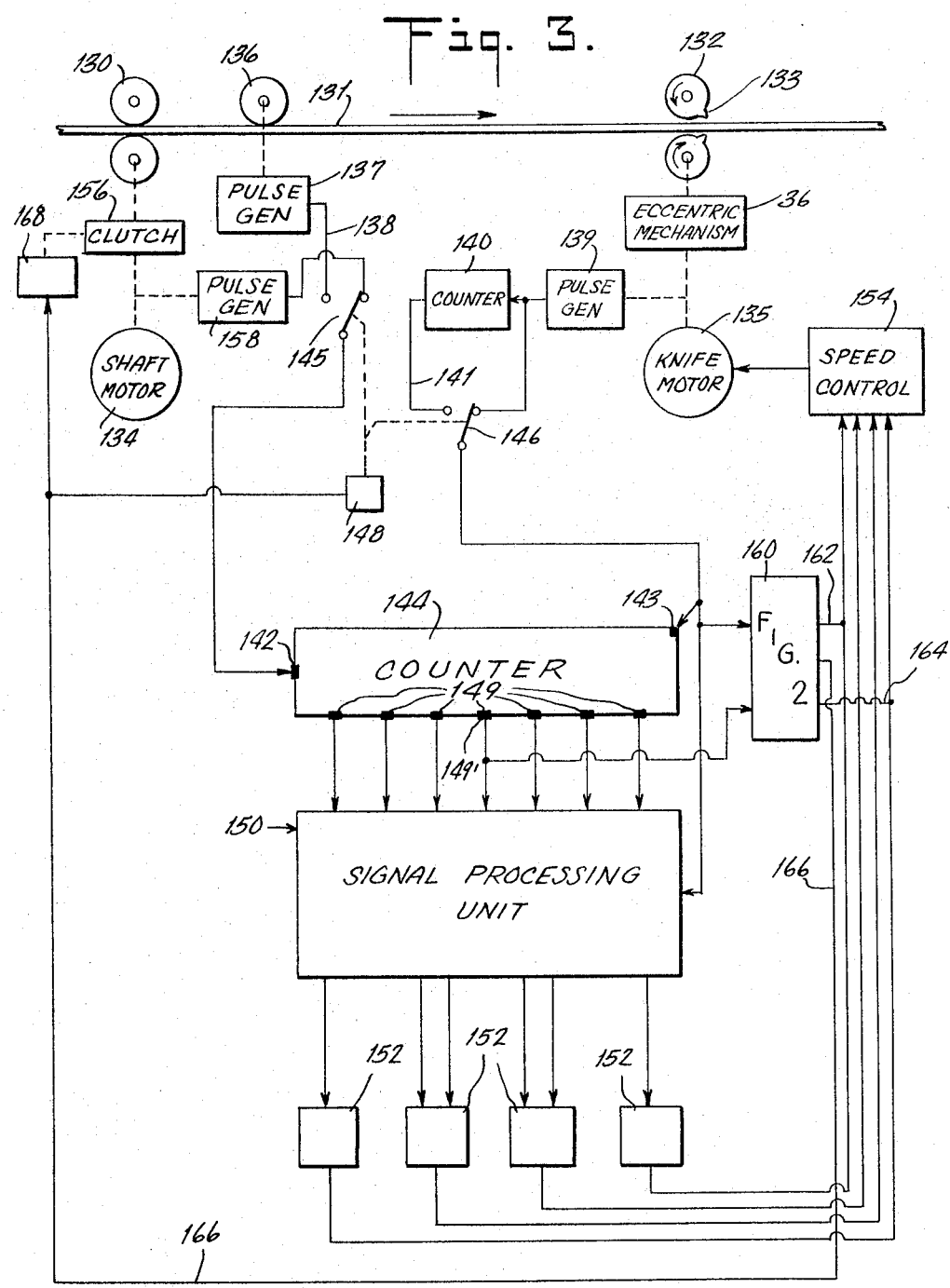

United States Patent Office 3,267,781
Patented August 23, 1966

3,267,781
METHOD AND APPARATUS FOR PRESETTING MATERIAL CONSUMING MACHINES TO ADJUST PRODUCT PARAMETERS
Robert B. Sterns, Great Neck, and Richard McGuire, Brooklyn, N.Y., assignors to Logic Systems, Inc., Great Neck, N.Y., a corporation of New York
Filed Oct. 30, 1963, Ser. No. 320,224
27 Claims. (Cl. 83—37)

This invention relates to automatic control devices and more particularly it concerns apparatus for the presetting of certain parameters prior to the commencement of an industrial operation or process.

From time to time is becomes necessary to reset certain production apparatus in order to produce items of a different size or other characteristic. Very often this leads to considerable "down time" losses while the apparatus is being adjusted to its new setting. Also, the readjustment is generally made by producing a number of sample items and then determining their deviation from the new desired characteristic. The sample items in most cases are completely unuseable and this accounts for another significant loss factor.

The above described down time and wasted sample problems exist even where the operation is of the self regulating or servo-controlled variety. While systems of this type are provided with built in measuring and control apparatus for automatically resetting them based upon any deviation of the items produced from a desired value; nevertheless, these arrangements are accurately sensitive only to minor deviations about a given setting of the system and the system could not follow a completely new and extensive readjustment with any degree of reliability or acceptable speed.

These readjustment problems are particularly acute in that portion of the paper processing industry which involves the severing of a continuous moving web of corrugated board into individual lengths for ultimate formation into containers. In connection with this, it is essential that the knife blades of the severing apparatus be properly synchronized with the web movement to ensure that the web is cut into proper lengths. Where the cut lengths are too long, expensive trimming is required; and if they are too short they are completely unuseable and can only be discarded. Although self contained and automatic measurement and control means can be provided, such as described for example, in a copending application Serial No. 214,679, filed August 3, 1962, now Patent No. 3,181,403, granted May 4, 1965 and entitled Control Systems, such means are generally sensitive only to a certain range of length variations; or they provide only very small corrections after a number of lengths have been cut. Consequently, these means alone are ineffective to make a major readjustment of the apparatus based simply upon a change in setting for a different length of cut.

According to one feature of the present invention there is provided a control apparatus which rapidly and automatically adjusts certain parameters of a manufacturing operation with a minimum amount of "down time" and without loss of material due to the production of sample items. This has been accomplished through the provision of a novel servo type control means in conjunction with a disengageable means strategically located to permit the manufacturing device to operate without producing samples. The novel servo control means includes a synthetic signal generator which is placed in the appaartus near the disengageable means and which operates to simulate the effect that the apparatus or system would have produced on the material if the disengageable means were engaged. These synthetic signals are then utilized in the normal servo manner to control the operation of the apparatus.

When these signals begin to occur in a certain manner indicating that the apparatus is within a given range of accuracy, then the disengageable means becomes re-engaged and the apparatus reverts to normal operation.

According to another feature of the present invention rapid presetting is accomplished because the synthetic signal is utilized continuously to recorrect or adjust the apparatus even though under normal conditions its counterpart may not be so used until after one or more items have been produced. This rapidity of correction, while reducing down time, also permits a coarseness of correction which in turn allows a generally more simplified and therefore more dependable measurement and control than would normally be expected.

There has been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a perspective view, partially in schematic, illustrating one embodiment of the present invention;

FIG. 3 is a schematic diagram illustrating a further application of the apparatus shown in FIG. 1.

Figure 2:
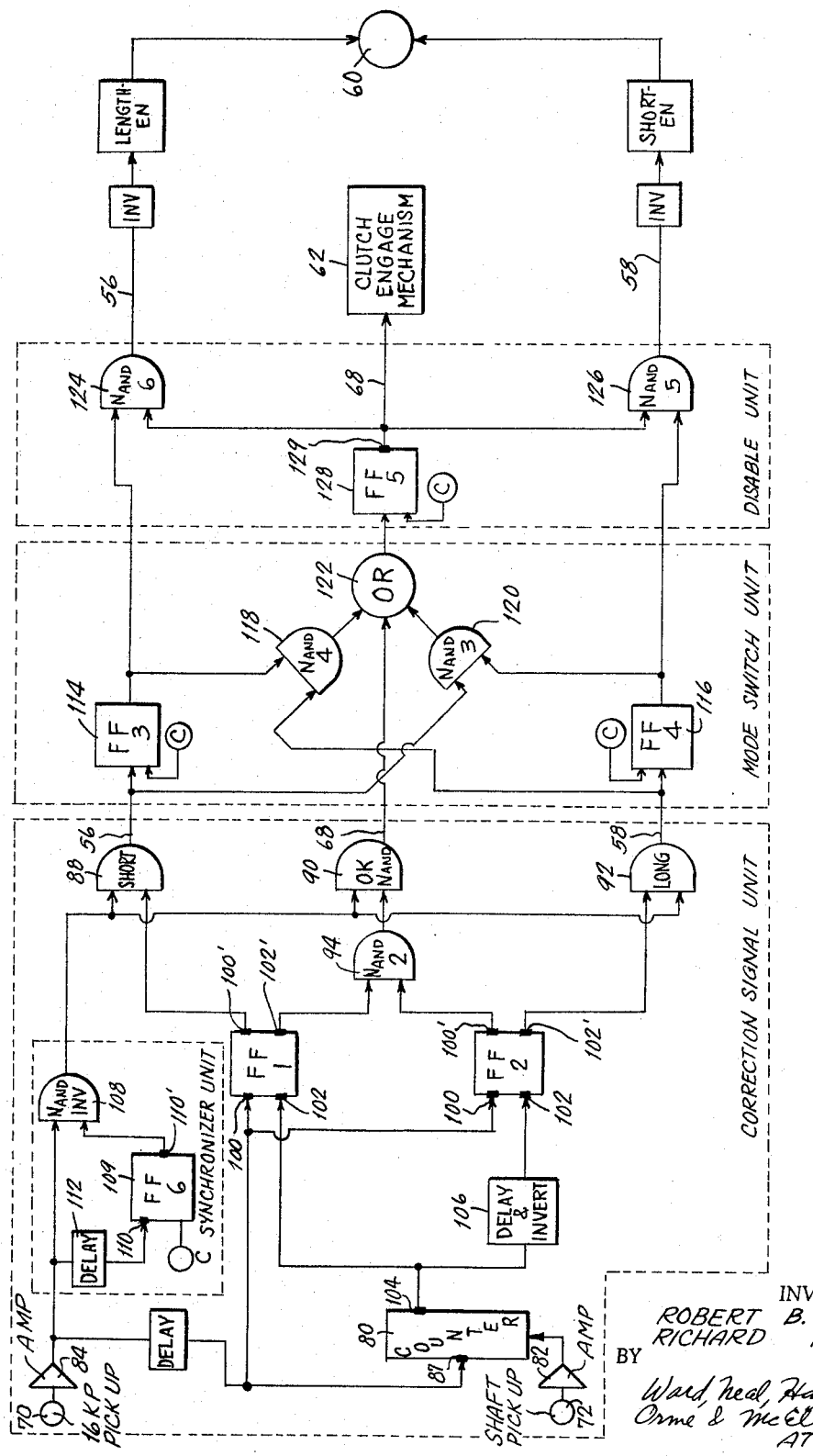
FIG. 2 is a schematic diagram illustrating in greater detail the signal control portion of the apparatus shown in FIG. 1.

In the illustrative embodiment, as shown in FIG. 1, a web 10 of paperboard or similar material is driven by means of upper and lower drive belts 12 and 14, toward a pair of knife rolls 16. The knife rolls are spaced apart, above and below the web and each is provided with a cutter blade 18 extending axially along its outer surface. The cutter blades are arranged so that once during each revolution of the knife rolls, they enmesh and act to shear off the web across its width.

A common drive motor 20 powers both the drive belts 12 and 14 and the knife rolls 16. A belt drive 22 or similar arrangement connects an output spindle 24 on the motor to a main drive shaft 26. One end of the drive shaft is coupled through a disengageable means, such as a clutch mechanism 28 to a pair of web rollers 30 about which the drive belts 12 and 14 are looped. When the clutch mechanism 28 is in its engaged condition the motor 20 drives through the main drive shaft 26 thereby causing the web rollers 30 and the drive belts 12 and 14 to move the web 10 toward the knife rolls. The other end of the drive shaft is coupled through a variable speed transmission 32 or analogous speed control mechanism, as well as through a knife drive shaft 34 and an eccentric mechanism 36 to the knife rolls 16. The operating point or input to output speed ratio of the variable speed transmission is set by the rotational position of a speed adjustment shaft 38 which in turn is driven by a control motor 40. When the control motor rotates the adjustment shaft in one direction, the knife drive shaft then turns faster for a given speed of the main shaft; whereas, when the adjustment shaft is rotated to a new position in the opposite direction the knife drive shaft turns more slowly.

The eccentric mechanism 36 operates to cause a sudden increase in knife roll speed while the cutter blades are enmeshed so that a clean and accurate cut will be produced. This unit operates on a cam principle and is responsive solely to the speed of the knife shaft. The length of time between complete rotations of the cutter blades, therefore, is directly proportional to the speed of the knife shaft, in spite of the fact that the rolls undergo a sudden increase and decrease in speed during actual shearing of the web.

It will be appreciated from the above description that for a given speed of web movement, the faster the knife rolls are turned the shorter will be the lengths of web which are cut and vice versa when the knife rolls are turned more slowly. The length of cut therefore is directly related to the ratio of the web speed to the knife roll speed. This ratio may be changed, of course, by causing the control motor 40 to rotate the adjustment shaft 38 so that the variable speed transmission functions at a different operating point. While this has no effect upon the speed of the web rollers 30 nor of the web 10, it does change the speed of the knife drive shaft 34, and consequently of the knife rolls 16, so that the overall ratio of web speed to knife roll speed is thereby modified.

There is provided in connection with the above described apparatus a shaft pulse generator 46 which is coupled to the main drive shaft 26 and which operates to generate a regular series of voltage impulses on a shaft pulse line 48 as the shaft turns. The amount by which the shaft turns is indicated by the number of pulses generated; and its speed of rotation is indicated by the pulse spacing in time or pulse rate. There is also provided a knifepulse generator 50 which is coupled to the knife drive shaft 34 and which generates voltage impulses on a knife pulse line 52 at a rate corresponding to the rate of knife roll rotation.

The shaft pulse line 48 and the knife pulse line 52 are connected to corresponding input terminals of a signal console 54. This console, which will be described more fully hereinbelow, detects the number of shaft pulses which occur between each knife pulse, and based upon this, it directs a correction signal out along either a lengthen correction line 56 or a shorten correction line 58, or, if the detected pulse ratio is within a given range, no correction signal at all is generated. These correction lines are connected to a motor control unit 60 which in turn causes the control motor to turn in a corresponding direction. Thus, if an excessive number of shaft pulses occur between knife pulses, this represents a knife roll speed which is too slow or a length of cut which is too long; and, accordingly, a signal is directed over the shorten correction line 58 which causes the knife rolls to turn faster.

Those skilled in the art will perceive the similarity of the system thus far described to an automatic servo type control such as is described for example in the aforementioned patent application entitled Control System. There are, however, important distinctions in the present system, namely, in the provision therein of the clutch mechanism 28 between the main drive shaft and the web rollers 30, as well as the substitution of the shaft pulse generator 46 for a web movement indicator responsive directly to movements of the web itself for producing voltage impulses.

Also provided in the present apparatus is a signal operated clutch engage mechanism 62 which is connected through a clutch control shaft 64 to the clutch mechanism. A clutch handle 66 is provided on the shaft 64 for manual disengagement of the clutch. The clutch engage mechanism receives a signal over a mode switch line 68 from the signal console 54 when the knife and shaft pulses reach a proper relationship; and upon receiving this signal it causes the clutch mechanism to re-engage so that the web rollers 30, and consequently the web 10 are then driven by the common drive motor 20.

In operation of the apparatus the clutch handle 66 is first pulled, causing the clutch mechanism 28 to disengage the main drive shaft from the web rollers 30 so that the web 10 is not driven toward the knife rolls; although the cut-off apparatus is otherwise operating in normal fashion. The shaft pulse generator 46 and the knife pulse generator 50 operate in normal manner during this time with the shaft pulse generator functioning in the capacity of a synthetic signal generator which produces pulse type signals simulative of the extent of potential web movement. The shaft pulse and knife pulse signals are applied to the signal console 54 where the number of shaft pulses occurring between each knife pulse is compared to a reference setting on a counter; and based upon this, correction signals are directed over an appropriate signal correction line 56 or 58 to cause the control motor 40 to adjust the knife roll speed. This, of course, causes the pulses from the knife pulse generator to become spaced differently in time and, accordingly, causes a different number of web pulses to appear between successive knife pulses. When the number of web pulses which occur between successive knife pulses comes within a preset range, no correction signal is generated, since the system at this point is in proper adjustment. When this occurs, however, a signal is directed over the mode switch line 68 to the clutch engage mechanism 62. This causes the clutch 28 to release so that the web rollers 30 become driven by the main drive motor 20 and the web 10 is moved in regular manner toward the knife rolls.

The signal console 54, which is shown diagrammatically in FIG. 2, operates to direct correction signals over the two correction lines 56 and 58, designated respectively as lengthen and shorten correction lines, based upon the relationship of the shaft and knife pulses which are applied to the console. The console further operates to direct a signal over the mode switch line 68 to the clutch engage mechanism 62 whenever the relationship between the pulses change in a predetermined manner; more particularly, when the relationship crosses at least one of the limits of an acceptable range. Thus, where a correction signal on one correction line is followed by a signal on the other correction line, or by no correction signal at all, a signal then appears on the mode switch line 68. A further function provided by the signal console is that of rendering itself inoperative upon the reengagement of the clutch mechanism so that normal operation of the web cutting apparatus is obtained automatically.

For purposes of clarity the elements of the signal console, as shown in FIG. 2, are divided by means of phantom lines into individual units which perform the various operations mentioned above. These units are designated respectively as the correction signal unit, the mode switch unit and the disable unit. There is also provided a synchronizer sub-unit within the correction signal unit.

The correction signal unit receives voltage impulses from the knife pulse and shaft pulse generators at a knife pulse input terminal 70 and a shaft pulse input terminal 72 respectively. Based upon the number of shaft pulses which occur between each knife pulse, the correction signal unit directs an output signal over either the lengthen correction line 56, the mode switch line 68 or the shorten correction line 58. Signals appearing on the shorten or lengthen correction lines, as can be seen, pass through various elements in the mode switch and disable units, while those signals on the mode switch line are used to activate the clutch engage mechanism 62.

The correction signal unit includes a pulse counter 80 which receives shaft pulses through a first amplifier 82 from the shaft pulse input terminal 72. The counter is arranged to be cleared following the occurrence of each knife pulse, the knife pulse passing from the knife pulse input terminal 70,, through a second amplifier 84 and a delay device 86 to a "clear" terminal 87 on the counter. The knife pulses are also directed through the synchronizer unit to one input of each of three AND or signal coincidence circuits, designated respectively as the SHORT AND circuit 88, the OK AND circuit 90, and the LONG AND circuit 92. These circuits, commonly known as "gates" or "gate circuits," operate in well known manner to produce an output signal whenever input signals appear simultaneously on two input terminals. The outputs of these AND circuits appear respectively on the lengthen correction, the mode switch and the shorten correction lines 56, 68 and 58. The remaining inputs of each of these three AND circuits are connected through a fourth AND circuit 94 and first and second bistable switching circuits 96 and 98, also known as multivibrators or flip-flops. These connections are made so that only one of the AND circuits receives a constant finite voltage at its second input terminal at a given time. The two flip-flops each have a first and a second input terminal designated respectively as 100 and 102 and corresponding first and second output terminals which in turn are designated as 100' and 102'. These flip-flop circuits also operate in well known fashion and respond to pulses applied to either input terminal to produce a continuous finite voltage at a corresponding output terminal. The first input terminal 100 of each of the flip-flop circuits is connected to receive signals from the knife pulse input terminal 70, while the second input terminal 102 of each flip-flop circuit is connected to receive signals from an output terminal 104 on the pulse counter 80 whenever the counter accumulates a certain number of shaft pulses. In the present arrangement both flip-flops are connected to the same counter output terminal with the second flip-flop circuit being connected through a signal inverter and time delay element 106. When the counter output terminal 104 is being energized, the waveform is such as to change the state of the first flip-flop 96, but because of the inversion produced by the element 106, it does not affect the second flip-flop 98. Upon deenergization of the counter output terminal, the waveforms are reversed and only the second flip-flop 98 is switched.

The first output terminal 100' of the first flip-flop circuit is connected as an input to the SHORT AND circuit 88 while the second output terminal 102' of the second flip-flop circuit is connected as an input to the LONG AND circuit 92. The remaining output terminals of the two flip-flop circuits are each connected as inputs to the fourth AND circuit 94, the output of which forms one input to the OK AND circuit 90.

The correction signal unit operates in the following manner. Each knife pulse which passes through the synchronizer unit is applied simultaneously to the SHORT AND, OK AND and LONG AND circuits 88, 90 and 92. Depending upon the number of shaft pulses which have accumulated in the pulse counter 80 since the time of the last preceding knife pulse, a particular one of these three AND circuits is receiving a finite voltage at its other input terminal and therefore, is capable of directing the knife pulse over an appropriate line.

While shaft pulses begin accumulating in the pulse counter 80, its output terminal 104 is unactivated and the two flip-flop circuits 96 and 98 produce finite voltages at their first output terminals 100', these circuits having thus been set by the last preceding knife pulse. This permits the first flip-flop circuit 96 to activate one input terminal of the SHORT AND circuit 88. However, none of the remaining AND circuits receive any activating voltages at this time. Thus, if a knife pulse occurs during this time (which would indicate too quick a cut and too short a cut length,), the pulse passes only through the SHORT AND circuit 88 and appears on the length correction line 56.

If, on the other hand, the knife pulse does not occur until after the pulse counter has accumulated a sufficient number of shaft pulses to activate its output terminal 104, but does occur before this terminal again becomes deactivated upon the occurrence of a subsequent shaft pulse, this would indicate that the ratio of knife speed to potential web speed is within acceptable limits. Under such circumstances, the two flip-flops are in mutually opposite states with the second output terminal of the first flip-flop 96 and the first output terminal of the second flip-flop 98 being activated and producing finite voltages. These voltages, which occur together, pass through the fourth AND circuit 94 and activate one input of the OK AND circuit 90. At the same time neither the SHORT AND circuit 88 nor the LONG AND circuit 92 are activated and the knife pulse passing through the synchronizer unit passes through the OK AND circuit 90 only, and appears on the mode switch line 68.

Finally, where the knife pulse which is applied to the three AND circuits 90, 92 and 94, occurs after the pulse counter output 104 has activated the second input terminal 102 of both flip-flops, only the LONG AND circuit 92 receives an activating voltage; and consequently the knife pulse passes through this circuit to appear on the shorten correction line 58.

The purpose of the synchronizer unit is to ensure that the count in the pulse counter had its beginning at the occurrence of the last previous knife pulse. Thus, the first knife pulse is prevented from being admitted to any of the AND circuits and is permitted only to clear the pulse counter. This synchronizer unit includes a synchronizer AND circuit 108 connected in series between the knife pulse input terminal 70 and the three correction signal AND circuits 90, 92 and 94. A synchronizer flip-flop circuit 109 is provided with one input terminal 110 connected through a delay element 112 to receive knife pulses and a corresponding output terminal 110' connected to activate the synchronizer AND circuit. The remaining input terminal (shown as C) is connected to a reset means so that prior to operation of the system the first flip-flop output terminal is deactivated or at zero voltage. Thus, the first occurring knife pulse does not pass through the synchronizer AND circuit 108; but shortly thereafter this pulse does activate the synchronizer flip-flop 109 so that the synchronizer AND circuit then receives a finite continuous voltage which permits it to pass the next subsequently occurring knife pulse.

The mode switch unit operates to produce a clutch engage signal on the mode switch line 68 when no correction signal appears on either correction signal line, or when a correction signal appears first on one of the correction lines and then on the other. If either of these conditions take place the system has corrected to its fullest extent and the cut-off apparatus automatically reverts to normal operation.

This mode switch unit includes a lengthen flip-flop circuit 114 and a shorten flip-flop circuit 116 with their first input and corresponding first output terminals connected in series in the lengthen and shorten correction lines 56 and 58 respectively. The second input terminal of each of these flip-flop circuits (shown as C), is connected to be activated prior to start of operation so that no signal may appear on either the shorten or the lengthen line until a knife pulse first occurs. These flip-flop circuits further operate to convert the knife pulse to steady continuous correction voltages.

There are also provided two mode switch AND circuits 118 and 120 each having two inputs, one of which is connected to the first input of one of the mode switch flip-flop circuits, and the other of which is connected to the first output of the other mode switch flip-flop circuit. The outputs of these two mode switch AND circuits, as well as the mode switch line 68 (the output of the OK AND circuit in the correction signal unit) are connected as inputs to an OR circuit 122. This OR circuit also operates in well known manner to permit a signal to pass out along the mode switch line 68 upon application of a finite voltage at one or more of several input terminals. Where a correction signal appears on either of the correction lines, it cannot pass through the mode switch AND circuits 118, 120 to the OR circuit 122, and consequently, no signal can pass through the OR circuit and out the mode switch line to operate the clutch engage mechanism. One effect of the occurrence of a signal on the correction line, however, is that in passing through a particular flip-flop circuit it causes a continuous voltage to appear at one input of one of the mode switch AND circuits. A correction signal which then subsequently appears on the opposite line can pass through the AND circuit previously activated by the prior pulse. This subsequent signal then passes through the OR circuit, ultimately to activate the clutch engage mechanism.

The disable unit includes a pair of disable AND circuits 124 and 126 having one input and an output connected in series in the lengthen and shorten correction lines 56 and 58 respectively. Also provided is a disable flip-flop circuit 128 having a first input terminal (shown as C) connected to be activated upon initiation of operation of the system, and having a corresponding first output terminal 129 connected to the remaining input of each of the disable AND circuits. This corresponding output terminal is also connected via the mode switch line 68 to the clutch engage mechanism 62. The remaining input terminal of the disable flip-flop circuit 128 is connected to via a portion of the mode switch line 68 to the output of the OR circuit 122 in the mode switch unit.

When the disable unit is put into operation a signal is applied at the first input terminal of the disable flip-flop circuit so that its corresponding output terminal supplies activating signals to the disable AND circuits 124 and 126 in each of the correction lines. These lines are thereby enabled to pass signals for making corrections to the speed of the knife rolls. Also, according to the present arrangement the clutch engage mechanism 62 is designed to maintain disengagement of the clutch mechanism so long as a finite signal appears on the mode switch line at the output of the disable flip-flop circuit and to permit re-engagement of the clutch mechanism in the absence of such a signal. Thus, when either no correction signal is produced or when a signal on one correction line is followed by a signal on the other correction line so as to produce a mode switch signal at the output of the OR circuit in the mode switch unit, the flip-flop circuit is switched so that it no longer supplies a finite voltage to activate the disable AND circuits in these correction lines. This prevents further corrections from being effected by the preset unit. At the same time, the absence of a finite signal on the mode switch line leading to the clutch engage element permits the clutch mechanism to become re-engaged so that ordinary operation of the web cutting apparatus may be assumed.

It is possible, as illustrated in FIG. 3, to incorporate the preset unit of the present invention for use in conjunction with an automatic control device such as that described in the aforementioned patent application Serial No. 214,679. As will be appreciated, it is possible to utilize many of the same components for operation of both the preset unit and the control system.

The apparatus shown in FIG. 3 includes a pair of drive rolls 130 which drive a continuous web 131 toward a pair of knife rolls 132, the knife rolls containing cutter blades 133 which sever the web into lengths upon each revolution of knife rolls. In the arrangement shown, the web and knife rolls are driven by separate motors 134 and 135, and the ratio of their speeds is controlled by electrically varying the speed of the knife roll motor. However, if desired, a single drive motor may be utilized for driving both the web and knife rolls; and a variable speed transmission may be connected between the motor and knife rolls to change the lengths of cut, as is done in the arrangement shown in FIG. 1. Web movement during normal operation is detected by means of a roller element 136 which rests upon the web at some point between the web rolls and the knife rolls. This roller element is connected to a web pulse generator 137 which produces, on an operate mode web pulse line 138, a series of impulses spaced in time by an amount proportional to the rate of web travel.

The movement of the knife rolls 132 is detected by means of a knife pulse generator 139 connected to the shaft which drives these rolls. For reasons which will become apparent the knife pulse generator is arranged to produce 16 pulses for each revolution of the knife rolls so that each sixteenth pulse represents one cut made by the rolls. In order to extract the sixteenth pulses there is provided a sixteen count capacity counter 140 which operates in the nature of a divider to produce on an operate mode knife pulse line 141 one pulse for each 16 input pulses.

The signals which appear on the operate mode web pulse line 138 and on the operate mode knife pulse line 141 are applied respectively to input and clear terminals 142 and 143 of a main counter 144 when certain movable elements 145 and 146 of a mode switch 148 are in operate mode position. The main counter 144 contains a plurality of output terminals 149 which become activated according to the number of web pulses accumulated in the counter since it was last cleared by a knife pulse. These output terminals are connected to corresponding input terminals in a signal processing unit 150 where they are compared in a preset manner; and based upon such comparison signals are directed out to certain correction relays 152. The correction relays in turn supply appropriate correction signals to a speed control unit 154 to change the speed of the knife rolls in a direction and by an amount sufficient to cause the lengths of severed web to be brought within desired limits.

For purposes of preset operation there is additionally provided a clutch mechanism 156 between the web roll motor and the web rolls. Also provided is a simulator pulse generator 158 connected between the web roll motor 134 and the clutch mechanism 156. This simulator pulse generator operates as the shaft pulse generator of the embodiment in FIG. 1 to generate signals simulative of the potential movement of the web were the clutch engaged.

A signal console 160 similar to that described in connection with FIG. 2 is also provided. This signal console however, instead of requiring a counter circuit of its own, is arranged to make use of the main counter circuit 144. This is done by providing a connection thereto from an output terminal 149 of the main counter which corresponds to the output terminal 104 of the counter in FIG. 2. Also, as in FIG. 2, the signal console has output correction lines 162 and 164 which are connected through the speed control unit 154 to adjust the speed of the knife roll motor 135; and a mode switch output line 166 which is connected to a clutch engage mechanism 168 for re-engaging the clutch when the system becomes adjusted to within acceptable limits. This mode switch output line is also connected to the mode switch unit 148 which controls the position of the various movable mode switch elements 145 and 146.

During the preset mode, when no items are being produced it is preferable that the apparatus be set as quickly as possible to avoid "down time" losses. Inasmuch as the system need only be preset to within a range of operation of its automatic servo control elements, it is possible to utilize rough or approximate indications, such as ratios of rates of web and knife travel rather than total web travel between knife cuts.

This may be accomplished by basing corrections upon the amount of potential web movement or the number of web pulses from the simulator pulse generator which occur, not between each cut but which occur between given subdivisions of time between cuts. Thus the main counter and the signal console are arranged by means of the mode switch elements to receive signals directly from the knife pulse generator which produces a knife pulse for each sixteenth of the duration between actual knife cuts.

The mode switch elements are initially set as shown to connect the system in its preset mode of operation. In this condition the clutch mechanism 156 is disengaged and the mode switch elements 145 and 146 are connected to supply signals from the simulator pulse generator 158 and the immediate output of the knife pulse generator 139 to the main counter 144 and the signal console 160. Preset operation in this mode continues in the manner explained until the system becomes adjusted to a point within its preset limits. At this point a signal appears on the mode switch output line 166 to effect re-engagement of the clutch mechanism 156 and to actuate the mode switch 148 which causes the mode switch elements 145 and 146 to connect the web pulse generator 137 in place of the simulator pulse generator 158; and to connect the output of the 16 count counter 140 to the main counter and to the signal processing unit 150 so as to place the apparatus in its normal mode of operation.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. A method for presetting material consuming machinery comprising the steps of disengaging said machinery from particular ones of its material consuming elements, generating signals simulative of the effect of the disengaged material consuming elements and re-engaging said machinery with said material consuming elements when said simulative signals achieve a preselected value.

2. A method for presetting material consuming machinery comprising the steps of disengaging said machinery from particular ones of its material consuming elements, generating signals simulative of the effect of the disengaged material consuming elements and re-engaging said machinery with said material consuming elements when said simulative signals occur in a preselected manner.

3. A method for presetting material consuming machinery, said method comprising the steps of operating said machinery without passage of material therethrough, generating signals representative of the operation of selected portions of said machinery, comparing said signals in a manner to produce further signals representative of the potential effect of said machinery as set for a desired effect, degeneratively controlling the setting of said machinery based upon said further signals to effect reduction thereof and causing said machinery to operate with material passing therethrough when said further signals occur in a preselected manner.

4. A method for presetting a self-regulated material consuming machine having material moving control elements which moves material therethrough at various rates and material affecting control elements which operate to deform the moving material, said method comprising the steps of disengaging said machine from said material moving elements while operating the remainder of said machine, generating synthetic signals simulative of the potential movement of material through said machine, comparing said synthetic signals with signals representative of the operation of said material affecting control elements in a manner producing signals indicative of the potential output of said machine, comparing said indicative signals with a range of values representative of acceptable operation of said machinery, adjusting certain elements of said machinery based upon the magnitude of said indicative signals relative to said acceptable range and initiating movement of material through said machinery when said indicative signals occur in a particular manner relative to said range.

5. Apparatus for presetting material consuming machinery comprising disengageable means associated with particular material consuming elements of said machinery and operative to disengage said machinery from said material consuming elements, synthetic signal generator means connected to said machinery near its point of disengagement and operative to generate synthetic signals simulative of the effect of said particular material consuming elements, and means operative to re-engage said disengageable means in response to said synthetic signals achieving a preselected value.

6. Apparatus for presetting material consuming machinery comprising disengageable means associated with particular material consuming elements and operative to disengage said machinery from said particular material consuming elements, synthetic signal generator means connected to said machinery near its point of disengagement and operative to generate synthetic signals simulative of the effect of said particular material consuming elements, means responsive to said synthetic signals for resetting said machinery to operate differently on said particular material consuming elements, and means operative to re-engage said disengageable means in response to said synthetic signals occurring in a preselected manner.

7. Apparatus for presetting material consuming machinery, said apparatus comprising means for operating said machinery without passage of material therethrough, means for generating signals representative of the operation of selected portions of said machinery, signal comparing means for producing further signals representative of the deviation of the potential effect of said machinery as set from a desired effect and for controlling the setting of said machinery based upon said further signals and means for automatically causing said machinery to operate with material passing therethrough when said further signals occur in a given manner.

8. Apparatus for presetting a material consuming machine having material moving control elements which move material at various rates and material affecting control elements which operate at various rates upon the moving material, said apparatus comprising disengageable means for disengaging said machine from said material moving control elements, synthetic signal generating means connected to said machine near its point of disengagement and operative to generate synthetic signals simulative of the effect of said material moving control elements, further signal generating means connected to said material affecting control elements and operative to produce further signals in accordance with the action of said material affecting control elements, and means operative to re-engage said disengageable means in response to said synthetic signals achieving a preselected relationship to said further signals.

9. Apparatus for presetting a material consuming machine having material moving control elements which move material at various rates and material affecting control elements which operate at various rates upon the moving material, said appartus comprising disengageable means for disengaging said machine from said material moving control elements, synthetic signal generating means connected to said machine near its point of disengagement and operative to generate synthetic signals simulative of the effect of said material moving control elements, further signal generating means connected to said material affecting control elements and operative to produce further signals in accordance with the action of said material affecting control elements, correction signal generating means for generating correction signals based upon the relationship between said synthetic signals and said further signals, means responsive to said correction signals for changing the operation of said machine on said control elements, and means operative to re-engage said disengageable means in response to said correction signals occuring in a preselected manner.

10. Apparatus for initiating operation of a material consuming closed loop regulatory system comprising means for disengaging said system from particular of its material consuming elements, simulator signal generating means connected to said system near its point of disengagement and operative to produce synthetic signals representative of the potential effect of said particular material consuming elements, means coupling said synthetic signals into said system to produce the usual correction signals and means responsive to said correction signals occuring in a preselected manner for re-engaging said system with said particular material consuming elements.

11. In a regulatory type closed loop material consuming system which is capable of adjusting to correct for variations within a given range, of a certain output characteristic, the combination of, means for disengaging said system from particular of its material consuming elements, simulator signal generating means connected to said system near its point of disengagement and operative to produce synthetic signals indicative of the potential relationship of said given characteristic with respect to said given range, means applying said synthetic signals to adjust said system for operation toward said given range, and means responsive to the said synthetic signals indicating a potential crossing by said given characteristic of one of the limits of said given range to re-engage said disengaging means.

12. In combination, a self-regulated system for imparting a given characteristic to several items in successive operations, said system including means sensitive, within a given range, to the magnitude of said characteristic on the items produced to adjust a parameter in said system for maintenance of said given characteristic at a selected value within said given range, disengageable means for disengaging said system from certain of its elements which move said items to permit operation of said system without consumption by it of said items, signal generating means connected to said system near said disengageable means and operative to generate synthetic signals generally simulative of the potential magnitude of said given characteristic, means responsive to said synthetic signals for adjustment of said parameter during continued successive operations of said system and means further responsive to said synthetic signals indicating a potential magnitude of said characteristic which for successive operations crosses at least one of the limits of said given range from outside said limits to re-engage said disengageable means.

13. Apparatus for automatically presetting industrial machinery of the type which includes continuously functioning material moving elements and intermittently functioning material distorting elements the operative inter-relation of said elements controlling the effect produced by said machinery upon successive items, said apparatus comprising, disengageable means for disengaging said material moving elements from said machinery, synthetic signal generator means connected to said machinery near said disengageable means and operative to produce artificial signals simulative of the potential movement of material by said machinery, further signal generator means connected to said material distorting elements and operative to produce signals representative of the operation of said material distorting elements, means responsive to the deviation of a given relationship between the signals from said synthetic signal generator and said further signal generator from a norm to adjust the operation of certain of said elements, and means further responsive to said given relationship occuring in a given manner with respect to said norm to re-engage said disengageable means.

14. Apparatus for automatically presetting industrial machinery of the type which includes continuously functioning material moving elements and intermittently functioning material distorting elements the operative inter-relation of said elements controlling the effect produced by said machinery upon successive items, said apparatus comprising disengageable means for disengaging said material moving elements from said machinery, synthetic signal generator means connected to said machinery near said disengageable means and operative to produce a first series of impulse type signals spaced in time by an amount proportional to the potential speed of movement of material by said machinery, further signal generator means connected to said material distorting elements and operative to produce a second series of impulse type signals spaced in time by an amount proportional to the time between the successive operations of said material distorting elements, means responsive to the relative spacing of signals in said first and second series to adjust said machinery in manner such that the actual speed of said material distorting elements becomes changed degeneratively relative to the potential speed of said material moving elements and means responsive to said relative spacing occurring in a given manner to re-engage said disengageable means.

15. Apparatus for automatically presetting industrial machinery of the type which includes continuously functioning material moving elements and intermittently functioning material distorting elements the operative inter-relation of said elements controlling the effect produced by said machinery upon successive items, said apparatus comprising disengageable means for disengaging said material moving elements from said machinery, synthetic signal generator means connected to said machinery near said disengageable means and operative to produce a first series of impulse type signals spaced in time by an amount proportional to the potential speed of movement of material by said machinery, further signal generator means connected to said material distorting elements and operative to produce a given number of equally spaced signals between each successive operation of said material distorting elements, said equally spaced signals constituting a second series, means responsive to the relative spacing of signals in said first and second series to adjust said machinery in a manner such that the actual speed of said material distorting elements becomes changed degeneratively relative to the potential speed of said material moving elements and means responsive to said relative spacing occurring in a given manner to re-engage said disengageable means.

16. Apparatus described in claim 14 wherein said apparatus further includes a plurality of signal coincidence circuits each receiving at one input terminal the pulse signals from said further signal generator means, a pulse counting means connected to receive impulses from said synthetic signal generator means, means associated with said counting means and operative to supply continuous energizing signals to different signal coincidence according to the number of pulses acccumulated in said counting means, means responsive to the simultaneous occurrence of energizing signals and pulse signals at particular signal coincidence circuits to adjust the operation of said material moving elements in degenerative fashion and means responsive to signals passing through said signal coincidence circuits in a preselected manner to re-engage said disengageable means.

17. In combination of a self-regulated system for imparting a given characteristic to several items in successive operations, said system including material moving elements and material distorting elements driven in adjustable relation to each other to vary the magnitude of said given characteristics and means sensitive to the magnitude of said given characteristc on the items produced to adjust said relation for maintenance of said given characteristic at a selected value within said given range, disengageable means for disengaging said system from certain of its elements which move said items to permit operation of said system without consumption by it for said items, synthetic signal generator means connected to said system near said disengageable means and operative to produce artificial signals simulative of the potential movement of material by said system, further signal generator means connected to said material distorting elements and operative to produce signals representative of the operation of said material distorting elements, means operative when said disengageable means is disengaged to adjust said relation in degenerative manner responsive to the relationship between the signals from said synthetic and further signal generators, and means responsive to signals from said synthetic and further signal generators occurring in a given manner to re-engage said disengageable means.

18. Apparatus for automatically presetting a web cutoff device of the type wherein a web of material is advanced by means of rollers toward a pair of rotating knife blades, the length of material cut by said blades being determined by the ratio of roller to knife blade speed, said apparatus comprising a clutch mechanism operative to disconnect said rollers from their driving means, a signal generator connected on the drive means side of said clutch mechanism and operative to produce signals simulative of the potential movement of web by said rollers when said clutch is disengaged, a second signal generator operative to generate signals representative of the rotation of said knife blades, means comparing the signals from said signal generators in a manner providing further signals representative of a potential length of web cut and means for re-engaging said clutch and disconnecting said means for comparing said signals in response to said last mentioned signal occurring in a preselected manner.

19. Apparatus for automatically presetting a web cutoff device device of the type which includes a pair of drive rolls which move a web toward a pair of web severing rotating knife rollers and which cutoff device further is automatically controlled by feed back means to maintain a given ratio between web speed and knife roll speed, said apparatus comprising a clutch means for disengaging the drive rolls from their driving means, a first signal generator on the driving means side of said clutch and operative to produce output signals representative of the potential rate of web speed, a second signal generator connected to produce output signals representative of the rate of rotation of said knife rolls, signal comparing means connected to receive and to compare the output signals from both said signal generators and to produce feedback control signals representative of the deviation of a simulated web speed to knife roll speed ratio from a given value, means for effecting degenerative control of said given ratio in response to said feedback control signals and means for re-engaging said clutch when said feedback control signals occur in a predetermined manner.

20. Apparatus for automatically presetting a web cutoff device of the type which includes a pair of drive rolls which move a web toward a pair of web severing rotating knife rollers and which cutoff device further is automatically controlled by adjusting knife roll speed based upon lengths of web cut thereby to maintain a given ratio between web speed and knife roll speed, said apparatus comprising a clutch means for disengaging the drive rolls from their driving means, a first signal generator on the driving means side of said clutch and operative to produce output signals representative of the potential rate of web speed, a second signal generator connected to produce output signals representative of the rate of rotation of said knife rolls, signal comparing means connected to receive and to compare the output signals from both said signal generators and to produce feedback control signals representative of the deviation of a simulated web speed to knife roll speed ratio from a given value, means for changing knife roll speed to effect degenerative control of said given ratio in response to said feedback control signals, and means for re-engaging said clutch when said feedback control signals occur in a predetermined manner.

21. Apparatus for presetting a self-regulated cutoff control mechanism of the type wherein a web is driven by means of a pair of drive rolls toward a pair of rotating knife rolls which sever the web into individual lengths, said apparatus including means for operating said mechanism without advancing web material therethrough, first signal generating means for producing signals representative of the potential movement of said web toward said knife rolls, second signal generating means for producing signals representative of the rotation of said knife rolls, means for comparing the signals produced by said first and second signal generating means and for producing therefrom deviation signals representative of the deviation of the ratio of speeds of potential web movement and knife roll rotation from a given standard and for utilizing said deviation signals to effect degenerative control of said deviation signals, and means for automatically causing web material to be drawn through said apparatus when said deviation signals fall below a given value.

22. Apparatus for presetting a digitally self-regulated web cutoff device of the type wherein a web of material is advanced by means of drive rolls toward a pair of knife rolls which sever the web into lengths governed by the relative speeds of web movement and knife roll rotation, said apparatus comprising means for operating said apparatus without movement of web material therethrough, a first pulse generator capable of generating pulse signals spaced in time by an amount proportional to the speed of potential web movement, a second pulse generator connected to said knife rolls and operative to produce a series of pulses spaced in time by an amount proportional to the rate of rotation of said knife rolls, counter means connected to produce signals on particular output terminals according to the number of pulses from said first pulse generating means which occur between successive pulses from said second pulse generating means, means for varying the speed of said knife rolls based upon the particular terminal of said counter becoming so activated and means for automatically imparting web movement to said apparatus when the signals controlling said knife roll speed occur in a preselected manner.

23. Apparatus for automatically presetting the operation of a self-controlled web severing apparatus of the type which includes drive rollers for advancing a web of material toward a pair of knife rollers, the length of severed web being controlled by the ratio of rotational speeds of the drive rollers and the knife rollers, said apparatus comprising a web roll driving means connected to rotate said web rolls, a clutch means interposed between said web roll drive means and said web rolls, a pulse generator interposed between said web roll drive means and said clutch means and operative to produce a series of impulses at a rate representative of the rate of movement of said web when said clutch is engaged, a pulse counter connected to accumulate signals from said pulse generator, a pulse generator connected to generate a series of pulses representative of the rate of rotation of said knife rolls, means connecting the output of said knife pulse generator to clear said counter upon each occurrence of each knife pulse, a plurality of signal coincidence circuits each connected to receive at one of two input terminals each of the said knife pulses, means for supplying a continuous energizing signal to the remaining terminal of a different one of said signal coincidence circuits based upon the accumulated count in said counter means, means for adjusting the rate of rotation of said knife rolls based upon signals emanating from said signal coincidence circuits and means for automatically re-engaging said clutch mechanism when signals emanate from said signal coincidence circuits in a given manner.

24. Apparatus described in claim 23 wherein there are three signal coincidence circuits representing respectively short, acceptable and long ranges of potential cut lengths, the signal coincidence circuit representing a short indication being so connected to effect a relative decrease in the rotational speed of said knife rolls, and the signal coincidence circuit representing the long indication being connected to effect an increase in the rotational speed of said knife rolls.

25. The apparatus described in claim 24 wherein the third signal coincidence circuit has its output connected to effect a re-engaging of said clutch mechanism.

26. The apparatus described in claim 24 further including means for re-engaging said clutch mechanism based upon the occurrence of an output from a signal coincidence circuit on one side of the okay signal coincidence circuit followed by the occurrence of a signal output from the signal coincidence circuit on the other side of the acceptable signal coincidence circuit.

27. The apparatus described in claim 25 further including a bistable switching device, the output of each of said short and long signal coincidence circuits and a pair of further signal coincidence circuits one of said further signal coincidence circuits being connected to receive signals from the output of one of said bistable switching devices and from the input of the other of said bistable switching devices the other of said further signal coincidence circuit being connected to receive ouput signals from the other of said bistable switching devices and to receive input signals from said one bistable switching device, the output of each of said further coincidence circuits being connected to re-engage said clutch mechanism.

References Cited by the Examiner
UNITED STATES PATENTS

| | | | |
|---|---|---|---|
| 2,233,490 | 3/1941 | Shields | 83—311 |
| 3,176,557 | 4/1965 | Drenning et al. | 83—76 |
| 3,195,385 | 7/1965 | Paterson | 83—76 |

WILLIAM S. LAWSON, *Primary Examiner.*

WILLIAM W. DYER, JR., *Examiner.*